United States Patent
Spaulding et al.

(10) Patent No.: US 7,506,450 B2
(45) Date of Patent: Mar. 24, 2009

(54) ADHESIVE MOUNT FOR A LEVELING DEVICE AND A LEVELING DEVICE

(75) Inventors: James Spaulding, Bristol, CT (US); John C. Murray, Canton, CT (US)

(73) Assignee: The Stanley Works, New Britain, CT (US)

( * ) Notice: Subject to any disclaimer, the term of this patent is extended or adjusted under 35 U.S.C. 154(b) by 7 days.

(21) Appl. No.: 11/477,589

(22) Filed: Jun. 30, 2006

(65) Prior Publication Data

US 2008/0000095 A1    Jan. 3, 2008

(51) Int. Cl.
*G01C 15/00* (2006.01)
*A47G 1/17* (2006.01)

(52) U.S. Cl. ............... 33/286; 33/281; 33/DIG. 21; 248/205.3

(58) Field of Classification Search ............ 33/281, 33/282, 283, 286, 291, 399, 404, DIG. 21; 248/683, 467, 205.3
See application file for complete search history.

(56) References Cited

U.S. PATENT DOCUMENTS

| | | | |
|---|---|---|---|
| 2,645,286 A | 7/1953 | Boyd | 164/42 |
| 2,711,030 A | 6/1955 | Drew et al. | 33/137 |
| 4,024,312 A | 5/1977 | Korpman | 428/343 |
| 4,208,802 A | 6/1980 | Berndt | 33/347 |
| 4,228,982 A | 10/1980 | Sellera | 248/467 |
| 4,898,787 A | 2/1990 | Min et al. | 428/480 |
| 4,924,597 A | 5/1990 | Tursi | 33/758 |
| 5,063,679 A | 11/1991 | Schwandt | 33/347 |
| 5,123,171 A | 6/1992 | Langston | 33/30.5 |
| 5,202,169 A | 4/1993 | Spendlove | 428/43 |
| 5,213,331 A | 5/1993 | Avanzini | 273/186.3 |
| 5,253,421 A | 10/1993 | Landmark | 33/27.03 |
| 5,260,563 A | 11/1993 | Hunter et al. | 250/214 |
| 5,289,215 A | 2/1994 | Clairmont et al. | 352/243 |
| 5,409,189 A | 4/1995 | Luhmann | 248/205.3 |
| 5,429,333 A | 7/1995 | Klein | 248/205.9 |
| 5,495,675 A | 3/1996 | Huang | 33/241 |
| 5,516,581 A | 5/1996 | Kreckel et al. | 428/317.3 |
| 5,568,265 A | 10/1996 | Matthews | 356/399 |
| 5,672,402 A | 9/1997 | Kreckel et al. | 428/34.2 |
| 5,807,637 A | 9/1998 | Schumann et al. | 428/423.1 |
| 5,855,073 A | 1/1999 | Boelling | 33/533 |
| 5,897,949 A | 4/1999 | Luhmann et al. | 428/317.3 |
| 5,928,747 A | 7/1999 | Luhmann et al. | 428/40.1 |
| 5,935,670 A | 8/1999 | Downs | 428/40.1 |
| 5,958,580 A | 9/1999 | Kohno et al. | 428/343 |
| 5,964,375 A | 10/1999 | Carlson et al. | 221/45 |
| 5,989,708 A | 11/1999 | Kreckel | 428/354 |

(Continued)

FOREIGN PATENT DOCUMENTS

JP    08-312630    11/1996

*Primary Examiner*—R. A. Smith
(74) *Attorney, Agent, or Firm*—Pillsbury Winthrop Shaw Pittman LLP

(57) ABSTRACT

A mount for removably mounting a device to a reference surface is provided. The mount includes a thermoplastic hot melt adhesive, and a tab that extends from the adhesive. The adhesive is configured to adhere to the surface and the device when the device is mounted to the surface. The adhesive is also configured to be removed from the surface without damaging the surface by moving the tab in a direction substantially parallel to the surface.

24 Claims, 9 Drawing Sheets

U.S. PATENT DOCUMENTS

| | | | |
|---|---|---|---|
| 6,001,471 A | 12/1999 | Bries et al. | 428/343 |
| 6,004,642 A | 12/1999 | Langford | 428/40.1 |
| 6,004,665 A | 12/1999 | Luhmann et al. | 428/317.3 |
| 6,033,762 A | 3/2000 | Decker | 428/201 |
| 6,071,583 A | 6/2000 | Pomerantz | 428/40.1 |
| 6,082,875 A | 7/2000 | Kousek | 362/259 |
| 6,096,387 A | 8/2000 | Decker | 427/510 |
| 6,106,937 A | 8/2000 | Hamerski | 428/343 |
| 6,115,931 A | 9/2000 | Arcand | 33/668 |
| 6,120,867 A | 9/2000 | Hamerski et al. | 428/40.1 |
| 6,124,935 A | 9/2000 | Matthews | 356/399 |
| 6,133,173 A | 10/2000 | Riedel et al. | 442/400 |
| 6,134,796 A | 10/2000 | Johnson | 33/457 |
| 6,136,397 A | 10/2000 | Luhmann et al. | 428/40.1 |
| 6,162,534 A | 12/2000 | Hamerski | 428/354 |
| 6,184,800 B1 | 2/2001 | Lewis | 340/932.2 |
| 6,217,696 B1 | 4/2001 | Hartmann et al. | 156/247 |
| 6,223,443 B1 | 5/2001 | Jacobs | 33/27.03 |
| 6,231,962 B1 | 5/2001 | Bries et al. | 428/317.3 |
| 6,245,177 B1 | 6/2001 | Luhmann | 156/182 |
| 6,259,241 B1 | 7/2001 | Krantz | 324/67 |
| 6,280,840 B1 | 8/2001 | Luhmann et al. | 428/343 |
| 6,296,904 B1 | 10/2001 | Zimmermann | 427/208.4 |
| 6,319,442 B1 | 11/2001 | Downs | 264/132 |
| 6,332,694 B1 | 12/2001 | Chih-Hsiung | 362/259 |
| 6,335,068 B1 | 1/2002 | Luhmann et al. | 428/40.1 |
| 6,372,335 B1 | 4/2002 | Luhmann et al. | 428/317.3 |
| 6,372,341 B1 | 4/2002 | Jung et al. | 428/354 |
| 6,405,983 B1 | 6/2002 | Goj | 248/205.1 |
| 6,406,781 B1 | 6/2002 | Hamerski | 428/317.3 |
| 6,410,135 B1 | 6/2002 | Hamerski et al. | 428/343 |
| 6,413,626 B1 | 7/2002 | Wollner | 428/317.3 |
| 6,427,241 B1 | 8/2002 | Manno | 2/60 |
| 6,475,324 B1 | 11/2002 | Hartmann et al. | 156/247 |
| 6,481,686 B1 | 11/2002 | Jan | 248/349.1 |
| 6,499,707 B2 | 12/2002 | Hamerski et al. | 248/205.3 |
| 6,502,319 B1 | 1/2003 | Goodrich et al. | 33/286 |
| 6,514,597 B1 | 2/2003 | Strobel et al. | 428/167 |
| 6,527,900 B1 | 3/2003 | Kreckel et al. | 156/247 |
| 6,541,089 B1 | 4/2003 | Hamerski et al. | 428/40.1 |
| 6,544,639 B1 * | 4/2003 | Luhmann et al. | 428/343 |
| 6,558,789 B1 | 5/2003 | Hamerski et al. | 428/343 |
| 6,569,521 B1 | 5/2003 | Sheridan et al. | 428/343 |
| 6,585,920 B1 | 7/2003 | Strobel et al. | 264/80 |
| 6,606,798 B2 | 8/2003 | El-Katcha et al. | 33/290 |
| 6,616,790 B2 | 9/2003 | Luhmann et al. | 156/247 |
| 6,640,864 B2 | 11/2003 | Downs | 156/540 |
| 6,641,096 B2 | 11/2003 | Johansson et al. | 248/205.3 |
| 6,641,892 B2 | 11/2003 | Luhmann | 428/99 |
| 6,641,910 B1 | 11/2003 | Bries et al. | 428/343 |
| 6,643,019 B1 | 11/2003 | Jeanneret | 356/399 |
| 6,660,352 B2 | 12/2003 | Hsu et al. | 428/40.1 |
| 6,663,064 B1 | 12/2003 | Minelli et al. | 248/205.5 |
| 6,666,420 B1 | 12/2003 | Carnevali | 248/205.8 |
| 6,691,421 B2 | 2/2004 | Roth et al. | 33/379 |
| 6,713,522 B2 | 3/2004 | Zhang et al. | 521/170 |
| 6,723,407 B2 | 4/2004 | Dollase et al. | 428/40.1 |
| 6,735,879 B2 | 5/2004 | Malard et al. | 33/286 |
| 6,737,135 B1 | 5/2004 | Luhmann et al. | 428/40.1 |
| 6,756,098 B2 | 6/2004 | Zhou et al. | 428/40.1 |
| 6,800,156 B2 | 10/2004 | Dietz et al. | 156/64 |
| 6,804,892 B1 | 10/2004 | Yung et al. | 33/286 |
| 6,811,126 B2 | 11/2004 | Johansson et al. | 248/205.3 |
| 6,821,619 B2 | 11/2004 | Hamerski et al. | 428/343 |
| 6,822,012 B1 | 11/2004 | Baumgart et al. | 521/170 |
| 6,829,834 B1 | 12/2004 | Krantz | 33/286 |
| 6,835,452 B1 | 12/2004 | Hamerski | 428/343 |
| 6,866,928 B2 | 3/2005 | Narum et al. | 428/354 |
| 6,871,408 B2 | 3/2005 | Malard et al. | 33/286 |
| 6,874,740 B1 * | 4/2005 | Leiber et al. | 248/205.3 |
| 6,880,259 B1 | 4/2005 | Schultz | 33/613 |
| 6,887,919 B2 | 5/2005 | Krawinkel et al. | 522/111 |
| 6,894,204 B2 | 5/2005 | Dunshee | 602/57 |
| 6,905,100 B2 | 6/2005 | Franck et al. | 248/205.3 |
| 6,910,667 B2 | 6/2005 | O'Leary et al. | 248/205.3 |
| 6,914,930 B2 | 7/2005 | Raskin et al. | 372/109 |
| 6,931,734 B2 | 8/2005 | Elder et al. | 33/42 |
| 6,935,034 B2 | 8/2005 | Malard et al. | 33/286 |
| 6,951,061 B1 | 10/2005 | Rosetti | 33/760 |
| 6,972,141 B1 | 12/2005 | Bries et al. | 428/40.1 |
| 6,984,428 B2 | 1/2006 | Krawinkel et al. | 428/41.3 |
| 6,986,923 B1 | 1/2006 | Junghans et al. | 428/40.1 |
| 7,028,958 B2 | 4/2006 | Pitzen et al. | 248/205.3 |
| 7,269,907 B2 * | 9/2007 | Levine et al. | 33/286 |
| 7,278,218 B2 * | 10/2007 | Levine | 33/286 |
| 2001/0019764 A1 | 9/2001 | Bries et al. | 428/317.3 |
| 2002/0017359 A1 | 2/2002 | Luhmann | 156/182 |
| 2002/0020072 A1 | 2/2002 | Roth et al. | 33/389 |
| 2002/0162236 A1 | 11/2002 | Roth et al. | 33/379 |
| 2002/0175250 A1 | 11/2002 | Lian | 248/205.5 |
| 2003/0134112 A1 | 7/2003 | Kreckel et al. | 428/343 |
| 2004/0025364 A1 | 2/2004 | Elder et al. | 33/770 |
| 2004/0086710 A1 | 5/2004 | Pitzen et al. | 428/343 |
| 2004/0092663 A1 | 5/2004 | Krawinkel | 525/89 |
| 2004/0109096 A1 | 6/2004 | Anderson et al. | 348/832 |
| 2004/0110882 A1 | 6/2004 | Krawinkel et al. | 524/334 |
| 2004/0123503 A1 | 7/2004 | Pitzen | 40/594 |
| 2004/0124325 A1 | 7/2004 | Kwok | 248/205.8 |
| 2004/0157976 A1 | 8/2004 | Junghans et al. | 524/492 |
| 2004/0185249 A1 | 9/2004 | Junghans et al. | 428/354 |
| 2004/0187327 A1 | 9/2004 | Levine | 33/286 |
| 2004/0205972 A2 | 10/2004 | Wu | 33/286 |
| 2004/0216319 A1 | 11/2004 | Muchnik | 33/666 |
| 2004/0258126 A1 | 12/2004 | Levine | 372/109 |
| 2005/0022399 A1 | 2/2005 | Wheeler et al. | 33/286 |
| 2005/0066533 A1 | 3/2005 | Wheeler et al. | 33/286 |
| 2005/0078303 A1 | 4/2005 | Murray | 356/138 |
| 2005/0155238 A1 | 7/2005 | Levine et al. | 33/286 |
| 2005/0198845 A1 | 9/2005 | Robinson | 33/227 |
| 2005/0204575 A1 | 9/2005 | Rosetti | 33/760 |
| 2005/0206891 A1 | 9/2005 | Khubani | 356/249 |
| 2005/0256254 A1 | 11/2005 | Luhmann et al. | 524/555 |
| 2005/0274030 A1 | 12/2005 | Spanski et al. | 33/286 |
| 2005/0278966 A1 | 12/2005 | Liu | 33/286 |
| 2005/0283987 A1 | 12/2005 | Nash | 33/286 |
| 2006/0017427 A1 | 1/2006 | Nash et al. | 324/67 |
| 2006/0059699 A1 | 3/2006 | Krantz et al. | 33/286 |
| 2006/0112576 A1 | 6/2006 | Lu | 33/286 |
| 2007/0056173 A1 * | 3/2007 | Burry et al. | 33/286 |
| 2007/0102601 A1 * | 5/2007 | Thompson | 248/205.1 |
| 2007/0169359 A1 * | 7/2007 | Lin | 33/286 |

* cited by examiner

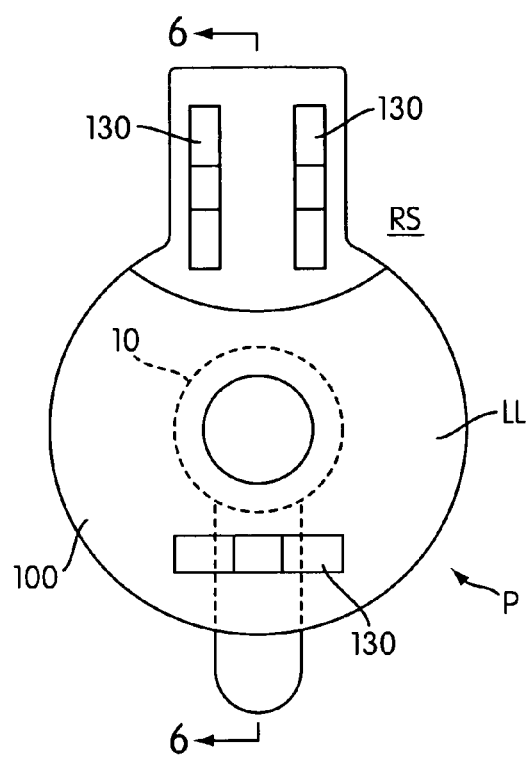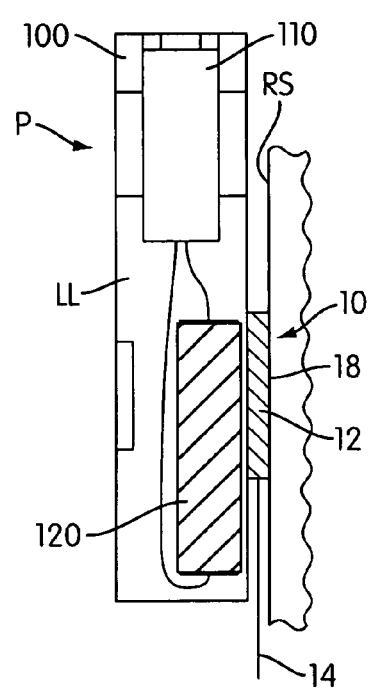
FIG. 5
FIG. 6

ADHESIVE MOUNT FOR A LEVELING DEVICE AND A LEVELING DEVICE

BACKGROUND OF THE INVENTION

1. Field of the Invention

The present invention relates to an adhesive mount. The present invention further relates to a leveling device. The present invention further relates to the combination of a leveling device and an adhesive mount for removably adhering the leveling device to a surface.

2. Description of Related Art

Mounting structures that are used to mount items to surfaces, such as walls, are widely used. For example, nails may be used to fasten a picture hanger to a wall in a semi-permanent manner. When hanging such pictures, leveling devices may be used to ensure the picture is level and/or lined up correctly with other features in a room. The leveling devices themselves may need to be temporarily attached to the wall so that the user may attend to the picture frame with two hands. Pins and other devices that may damage the wall have been used, as well as various suction-type devices. Adhesive devices have also been used to attach leveling devices to walls. However, such known adhesive devices have various shortcomings as well.

Wall mounted leveling devices have also been provided with various mechanisms that provide for desired positioning of the device on the wall, and additional mechanisms for enabling adjustment of a laser beam emitted from the leveling device after it has been wall mounted. Such known mechanisms have various shortcomings, and the present invention overcomes these shortcomings and provides further advantages as well.

BRIEF SUMMARY OF THE INVENTION

In an embodiment, a mount for removably mounting a device to a reference surface is provided. The mount includes a thermoplastic hot melt adhesive, and a tab that extends from the adhesive. The adhesive is configured to adhere to the surface and the device when the device is mounted to the surface, and to be removed from the surface without damaging the surface by moving the tab in a direction substantially parallel to the surface.

In an embodiment, a device is provided. The device includes a housing for supporting at least one light source arranged to form a line of light on a reference surface, a leveling device for positioning the light source so that the line of light projects on the reference surface in a desired orientation, and a mount for removably mounting the housing to a reference surface. The mount includes a thermoplastic hot melt adhesive and a tab attached to the adhesive. The adhesive is configured to adhere to the surface and the housing when the housing is mounted to the surface, and to be removed from the surface without damaging the surface by moving the tab in a direction substantially parallel to the surface.

In an embodiment, a method of manufacturing a mount is provided. The method includes dispensing a predetermined amount of molten thermoplastic adhesive on a release liner, attaching a tab to the adhesive while the adhesive is at a temperature above its softening point, and cooling the adhesive to a temperature below its softening point.

In an embodiment, a method of manufacturing a mount is provided. The method includes dispensing a first predetermined amount of molten thermoplastic adhesive on a release liner, attaching a pull tab to a portion of the first adhesive, dispensing a second predetermined amount of molten thermoplastic adhesive on a second release liner, and placing the second adhesive on the first adhesive and the pull tab.

In an embodiment, a device is provided. The device includes a housing, a vial carried by the housing, a light source carried by the housing, and a base movably connected to the housing. The base and the housing have cooperating structures so as to allow movement of the housing and the base relative to each other along an arc.

In an embodiment, a device is provided. The device includes a housing, a light source carried by the housing and arranged to form a line of light on a reference surface, an adhesive for removably mounting the housing to a reference surface, and a plurality of spacers configured to be movable between an extended position away from the housing and a retracted position at least partially within the housing. The plurality of spacers are configured to create a space between the reference surface and the adhesive when in the extended position relative to the housing and to allow the adhesive to contact the reference surface when in the retracted position relative to the housing.

In an embodiment, a method for mounting a device to a reference surface is provided. The device includes a housing for supporting at least one level, and a base movably connected to the housing. The method includes attaching at least one mount to the base, extending at least one spacer from the housing and past the base and the at least one mount, placing the at least one spacer against the reference surface, and applying a force to the housing so as to move the at least one spacer into the housing.

In an embodiment, a method for mounting a device to a wall is provided. The device includes a base for mounting on the wall, and a housing movably connected to the base. The housing supports at least one bubble vial and at least one light source for generating a beam of light on the wall on which the base is to be mounted. The method includes attaching the base to the wall, and moving the housing relative to the base along an arcuate path to adjust the beam of light in accordance with the bubble vial.

In an embodiment, a method for mounting a device to a reference surface is provided. The device includes a light source for generating a beam of light, and an adhesive for mounting the device to the reference surface. The method includes maintaining at least one spacer in an extended condition from the device as the device is moved relative to the reference surface, and forcing the device toward the reference surface so as to cause the spacer to retract and the adhesive to engage the reference surface, thereby adhering the device to the reference surface.

Other aspects, features, and advantages of the present invention will become apparent from the following detailed description, the accompanying drawings, and the appended claims.

BRIEF DESCRIPTION OF THE DRAWINGS

FIG. 5 is a top view of an embodiment of a leveling device that has been mounted to the reference surface with the mount of FIG. 1B;

FIG. 6 shows a cross-section taken along line 6-6 in FIG. 5;

DETAILED DESCRIPTION OF THE INVENTION

Figure 1A:
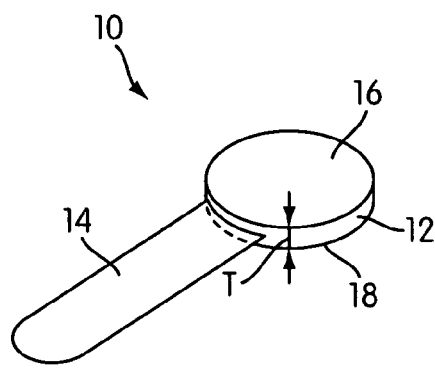
FIG. 1A shows a mount in accordance with an embodiment of the invention.
Figure 1B:
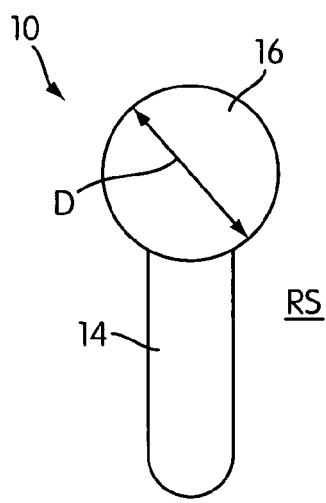
FIG. 1B shows the mount of FIG. 1B that has been mounted to a reference surface.

FIG. 1A shows a mount 10 according to an embodiment of the present invention. The mount 10 includes a pressure sensitive thermoplastic adhesive 12 with a pull tab 14 disposed therein. The mount 10 has a first surface 16, and a second surface 18 that is preferably substantially parallel to the first surface 16, thereby defining a thickness T of the mount 10 therebetween. The first and second surfaces 16, 18 each have sufficient adhesive properties so as to allow the mount 10 to adhere to a product P at the first surface 16, and to a reference surface RS at the second surface 18, as discussed in further detail below.

Figure 4:
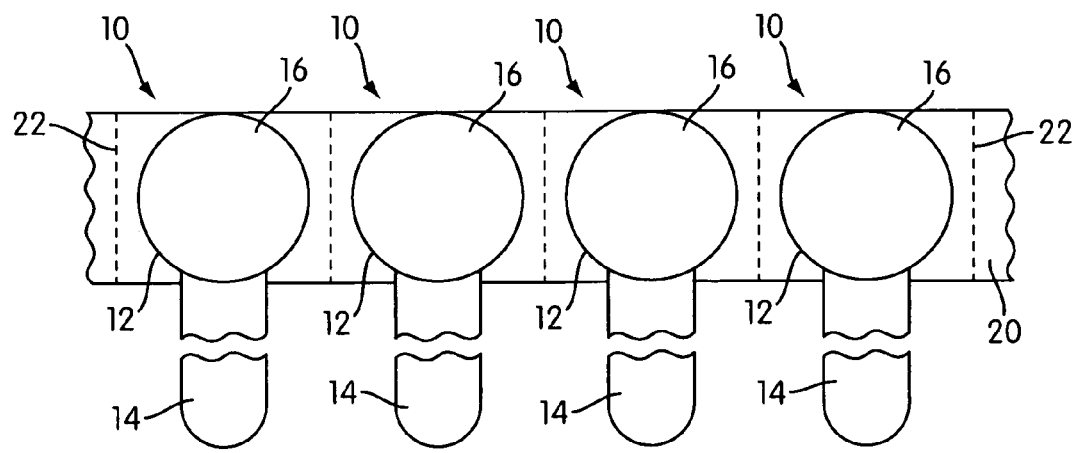
FIG. 4 shows an embodiment of a plurality of mounts on a backing tape in accordance with an embodiment of the invention.

The adhesive 12 is preferably a hot melt adhesive that is heated to a temperature that is above its softening point (typically in the range of about 60° C.-150° C.), which may be represented by its glass transition temperature, and dispensed in a predetermined amount onto a release liner 20. If the hot melt adhesive exhibits a melting point, it is preferable heated to a temperature that is above its melting point. As shown in FIG. 4, a plurality of mounts 10 may be dispensed on the liner 20 with perforations 22 being provided in the liner 20 in between the mounts 10 so that the mounts 10 may optionally be separated from each other at a later time.

Examples of manufacturing processes for dispensing hot melt adhesives that can be used in the present invention are disclosed in U.S. Pat. Nos. 5,935,670, 6,319,442, and 6,640,864, all of which are incorporated herein by reference in their entireties. In such manufacturing processes, a predetermined amount of adhesive is dispensed onto a liner.

In one embodiment of the present invention, the pull tab 14 is inserted into the adhesive 12 while the adhesive 12 is in the molten state, i.e. above its softening and/or melting point. This can be achieved by inserting (piercing) the pull tab 14 into the middle of a recently dispensed, molten mass of adhesive. The adhesive 12 is also preferably shaped into a disc while it is in the molten state. The adhesive 12 may be shaped into the disc by applying a second liner 20 to the first surface 16 of the adhesive 12, and applying pressure so as to form the disc. In other embodiments, the adhesive 12 may be shaped into other shapes, such as a square, rectangle, triangle, etc. Alternatively, a single release liner may be used such that once the adhesive 12 has been dispensed onto the release liner 20, the release liner 20 may be rolled so that the adhesive discs 12 are on an interior of the roll. This allows for the top surface 16 of the adhesive discs 12 to come into contact with the back of the release liner 20. The pressure created as the roll is created allows the adhesive discs 12 to be flattened. Once the adhesive 12 has cooled to a temperature below its softening point (i.e., its glass transition temperature), the mount 10 is ready to be used. The illustrated embodiment is not intended to be limiting in any way.

Figure 3A:
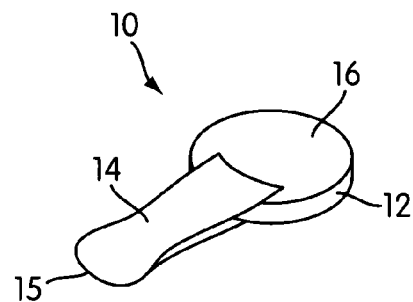
FIG. 3A shows another embodiment of the mount of FIG. 1A.
Figure 3B:
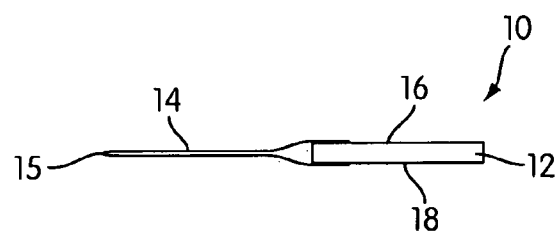
FIG. 3B is a side view of the mount of FIG. 3A.

In another embodiment, illustrated in FIGS. 3A and 3B, the pull tab 14 includes a hinge 15 in a center portion thereof, and one end of the pull tab 14 is attached to the first (top) surface 16 of the adhesive 12 and the other end of the pull tab 14 is attached to the second (bottom) surface 18 of the adhesive 12. In this embodiment, the pull tab 14 is attached to the adhesive 12 while the adhesive 12 is still at a temperature above its softening point. Alternatively, the pull tab 14 may be attached to the adhesive 12 after the adhesive 12 has cooled to a temperature below its softening point.

In embodiments, the predetermined volume of adhesive is between about 0.15 $cm^3$ and about 3.0 $cm^3$. The predetermined amount may be between 0.5 and 1.5 $cm^3$, and in one particular embodiment may be about 1.0 $cm^3$. In embodiments, the adhesive 12 of the mount 10 has a thickness T of about 2 mm to about 4 mm and a diameter D of about 10 mm to about 30 mm. The adhesive 12 may have a thickness T of between about 2.5-3.5 mm, and a diameter D of about 15-30 mm. In one particular embodiment, the adhesive 12 may have a diameter of about 24 mm and a thickness of about 3.0 mm. These ranges and values are not intended to be limiting in any way, but are instead intended to provide examples of the dimensions of the adhesive.

Figure 2:
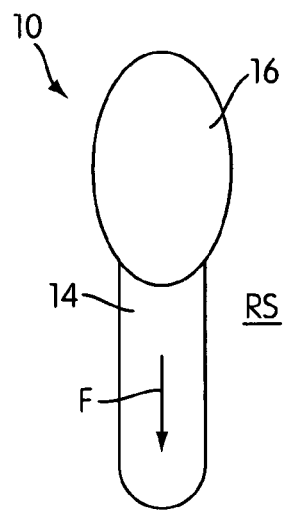
FIG. 2 shows the mount of FIG. 1B as it is being removed from the surface.

In an embodiment, the pull tab 14 is formed from polyvinylchloride (PVC). In other embodiments, the pull tab 14 may be formed from polyester, such as biaxially oriented polyethylene terephthalate (PET). The pull tab 14 may also be formed from a fibrous material, such as TYVEK®, which is a registered trademark of E. I. du Pont de Nemours and Company of Wilmington, Del. Preferably, the pull tab 14 is formed from a substantially rigid, non-stretchable material that deforms a very small (essentially zero) amount when force is applied to the pull tab. This allows the energy being applied to the pull tab 14 (shown as a force F in FIG. 3) to transfer to the adhesive 12 and deform the adhesive 12, as shown in FIG. 2, so that the adhesive 12 will release from the reference surface RS without damaging the reference surface RS. The pull tab 14 may have a length in the range of about 25-75 mm, a width in the range of about 7-15 mm, and a thickness in the range of about 0.1-0.2 mm. These ranges are not intended to be limiting in any way, but are instead intended to provide examples of the dimensions of the pull tab.

When the mount 10 is ready to be used, one of the liners 20 may be removed from the adhesive 12 so as to expose one side of the adhesive 12. The exposed side of the adhesive 12 may then be pressed against a product P to be mounted on a surface. In the illustrated embodiment, shown in FIGS. 5 and 6, the product P includes leveling device, such as a laser level LL, and the surface is a reference surface RS. It should be appreciated, however, that the mount 10 can be used to adhere other products to any appropriate surface. The laser level LL is discussed in greater detail below. The user may then remove the other liner 20 that is still attached to the adhesive 12, and press the adhesive 12 against the reference surface RS via the laser level LL, thereby firmly attaching the laser level LL to the reference surface RS. The mount 10 is attached to the laser level LL such that the pull tab 14 may be readily accessible (e.g., has sufficient length), even after the laser level LL has been mounted to the surface.

When the user has finished using the laser level LL, the mount 10 may be removed from the reference surface RS by pulling the tab 14 in a direction that is substantially parallel to the reference surface RS so as to create the force F, described above, in that direction, as shown in FIG. 3.

Figure 7:
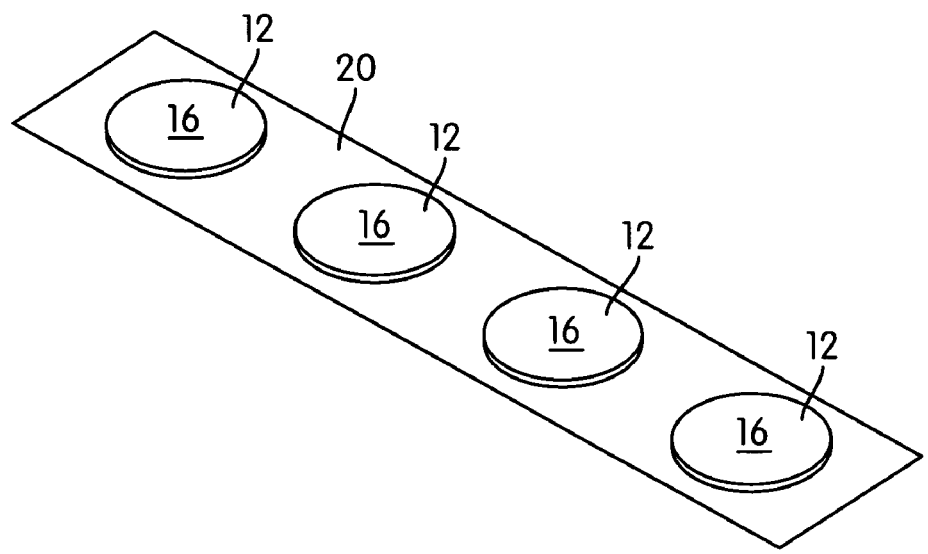
FIG. 7 is a perspective view of a plurality of adhesive discs after they have been formed on a release liner.
Figure 8:
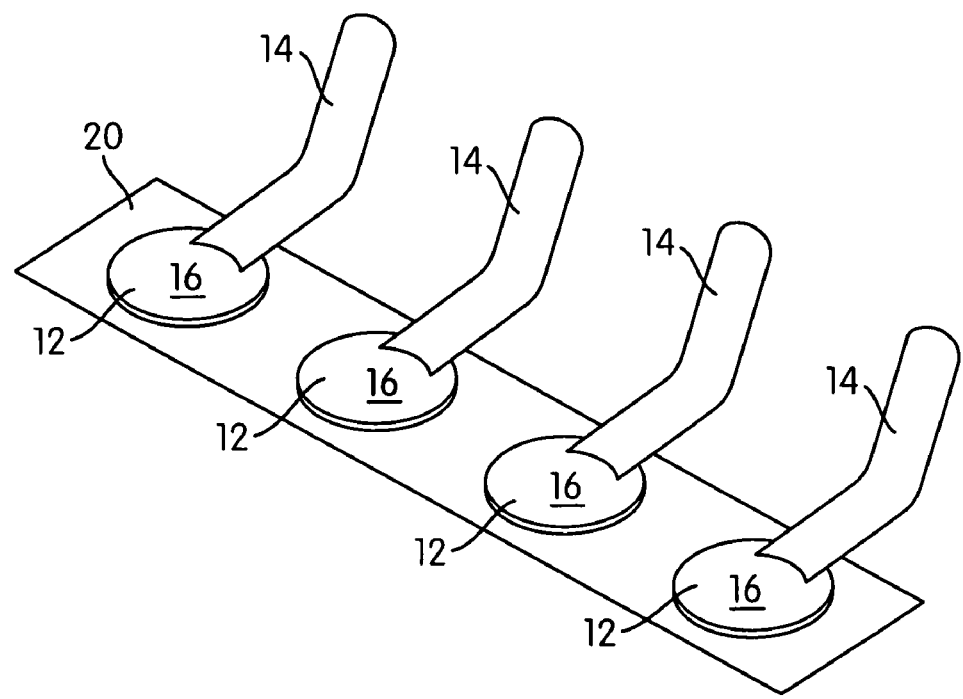
FIG. 8 is a perspective view of the discs of FIG. 7 after a pull tab has been attached to each disc.
Figure 9:
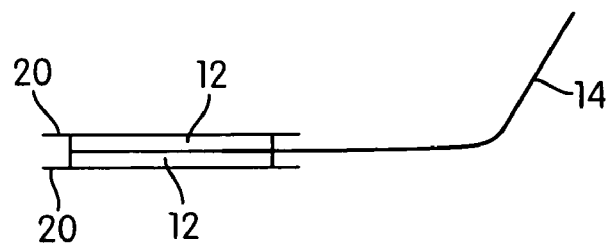
FIG. 9 is a side view of the discs and pull tabs of FIG. 8 with an additional disc and release liner positioned on a top side thereof.
Figure 10:
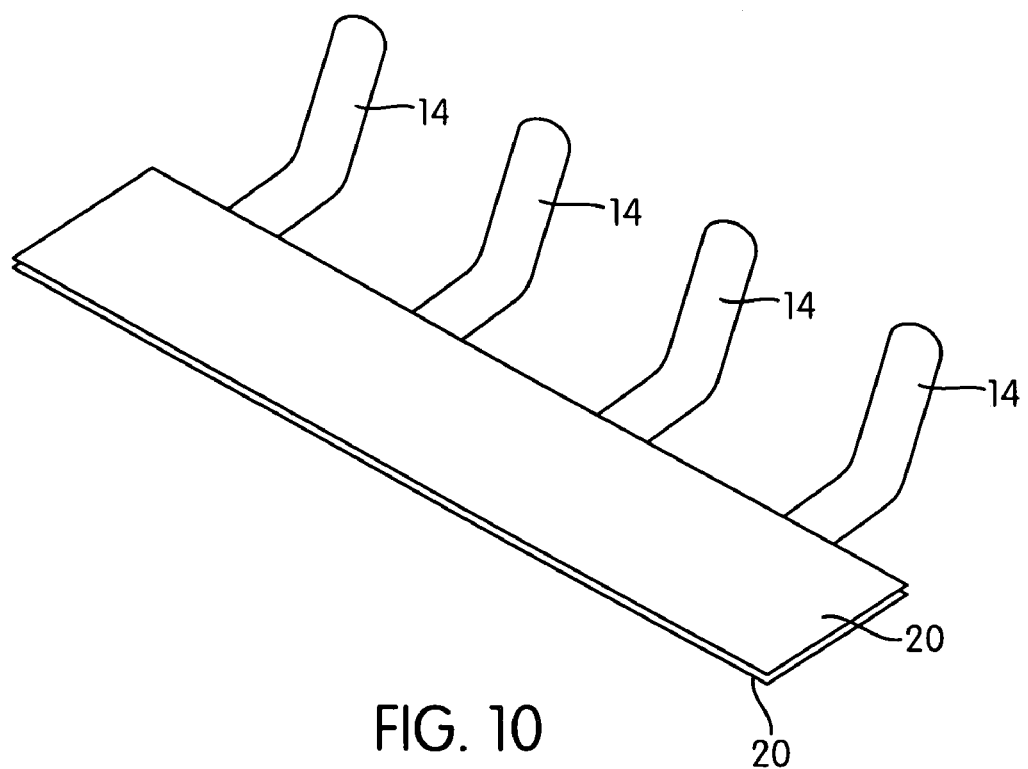
FIG. 10 is a perspective view of the discs of FIG. 9.
Figure 11:
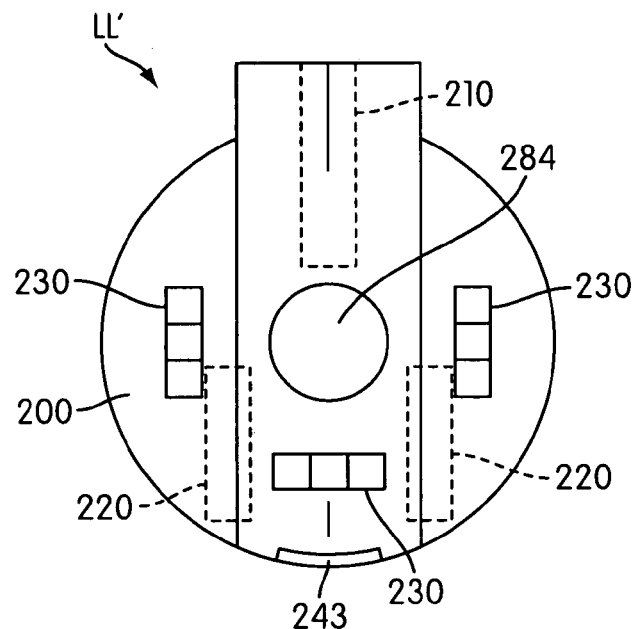
FIG. 11 is a top view of another embodiment of a leveling device.

FIGS. 7-10 illustrate another embodiment of a manufacturing process to manufacture a plurality of mounts 10, and the manner of positioning the pull tabs 14 relative to the adhesive during the manufacture process. In this embodiment, a plurality of adhesives 12 are formed in the shape of discs between a pair of release liners 20. As shown in FIG. 7, one of the release liners 20 is removed so as to expose the top surface 16 of the adhesives 12. Then, as shown in FIG. 8, one pull tab 14 is attached to the top surface 16 of each adhesive 12 such that the majority of the pull tab 14 extends away from the adhesive 12. Next, one of the release liners 20 is removed from a second plurality of adhesives 12, just like the ones shown in FIG. 7. The top surface 16 of each of the second plurality of adhesives 12 is positioned over the top surface 16 of one of the first plurality of adhesives 12, with the pull tab 14 in the middle, as shown in FIG. 9. This leaves the assembled plurality of mounts 10 in the condition shown in FIG. 10. Of course, the release liners may include perforations between the mounts 10 so that single mounts may be easily separated with the release liners 20 still attached to the mount 10. In addition, the liners 20 may be cut with scissors or some other type of blade in locations between the mounts 10 so that individual mounts 10 may be used. When one of the mounts 10 needs to be used, one of the release liners 20 may be pulled back so as to expose a single mount 10. The mount 10 may be applied to the product P and pressed in place and then the opposite release liner 20 may be removed from the mount 10. The product P is now ready to be attached to the reference surface RS.

In the illustrated embodiment of FIGS. 5 and 6, the laser level LL includes a housing 100, a light source 110 carried by the housing 100, and a power source 120 disposed within the housing 100. In one embodiment, the light source 110 is a laser or a laser diode. The power source 120, such as a battery, is electrically connected to the laser 110 to power the same. The laser 110 may be a laser diode. The laser level LL may also include a cylinder lens or other lens or mirror and/or optic system that converts the line beam generated by the laser 10 into a plane of light that, when projected onto a surface (such as the wall surface) forms a line of light on that surface. Such optic systems may also optionally be a prism lens, or a motor that rotates the laser 110 or a mirror or lens to generate a line on the desired surface (such as the wall surface on which the laser level LL is mounted). As shown in FIG. 5, the laser level LL also includes at least one bubble (spirit) vial 130 to provide a manual indication of the horizontalness (level) or verticalness (plumb) of the laser 10 itself. Bubble vials are generally well-known, so the details of the bubble vials 130 depicted in the figures will not be described herein. The vials 130 may be used to position the laser level LL before the mount 10 is pressed against the reference surface RS. This way, the line that is generated by the laser 110 provides a level or plumb reference line for the user. The laser level LL may also include an adjustor (not shown) that may be used to adjust the position of the laser 110 between the horizontal and vertical positions. For example, the adjustor may be an indexing mechanism that allows the laser 110 to be rotated by a known angle so that a line may be generated at a known angle relative to horizontal and/or vertical. The illustrated embodiment of the laser level LL is not intended to be limiting in any way, but is merely shown as an example of a leveling device that may be used with the mount 10 described above.

Another laser level LL, that can be used with the mount 10 is disclosed in United States Patent Application Publication No. 2005/0078303, which is hereby incorporated by reference in its entirety. In at least one embodiment of the laser level of the present invention, the laser level LL includes within the housing a stud finder circuit capable of detecting a stud located behind a wall surface (wall board). An example of one type of stud finder is disclosed in United States Patent Application Publication No. 2005/0078303, which is incorporated herein by reference in its entirety.

Another embodiment of a leveling device in the form of a laser level LL' is shown in FIGS. 11-14. In this embodiment, the laser level LL' includes a housing 200, and a light source 210 and power source 220 that are carried by the housing 200. In the illustrated embodiment, the light source 210 is a laser. Such lasers 210 are known and are described by, for example, U.S. Pat. No. 6,935,034, which is hereby incorporated by reference. The laser 210 may cooperate with a cylinder lens or other optical system as described above for generating a plane of light that is configured to intercept the reference surface RS when the laser level LL' is placed on the reference surface RS. In an embodiment, the laser 210 cooperates with a line lens of the type described in U.S. Pat. No. 6,914,930, which is hereby incorporated by reference.

In an embodiment, the laser 210 and any associated lens or optical system may be oriented so as to provide a beam of light that that includes a major axis that is parallel to the reference surface RS and a minor axis that is perpendicular to the reference surface RS. With the beam of light oriented with its major axis parallel to the reference surface RS, a line may be generated on the reference surface RS that is thicker and more visible than a line that is generated with a beam of light that is oriented with its major axis perpendicular to the reference surface.

The power source 220 may be a battery that is capable of powering the laser 210. In the illustrated embodiment, the power source 220 is a pair of batteries. Power between the power source 220 and the light source 210 may be controlled with a power switch 243. The power switch 243 may be moved between an ON position and an OFF position.

A plurality of bubble vials 230 are supported by the housing 200. In one embodiment, at least two vials are used and are disposed on the housing 200 so as to be perpendicular to each other and such that one of them has its longitudinal axis disposed generally parallel to the plane of light that is emitted from the housing 200 (while the other vial has its longitudinal axis perpendicular to the plane of light). This allows the laser 210 to generate a line on the reference surface that is either horizontal (level) or vertical (plumb), which are the two most commonly used orientations. The laser level LL' may be oriented in any position to generate a line on the reference surface at any angle.

Figure 12:
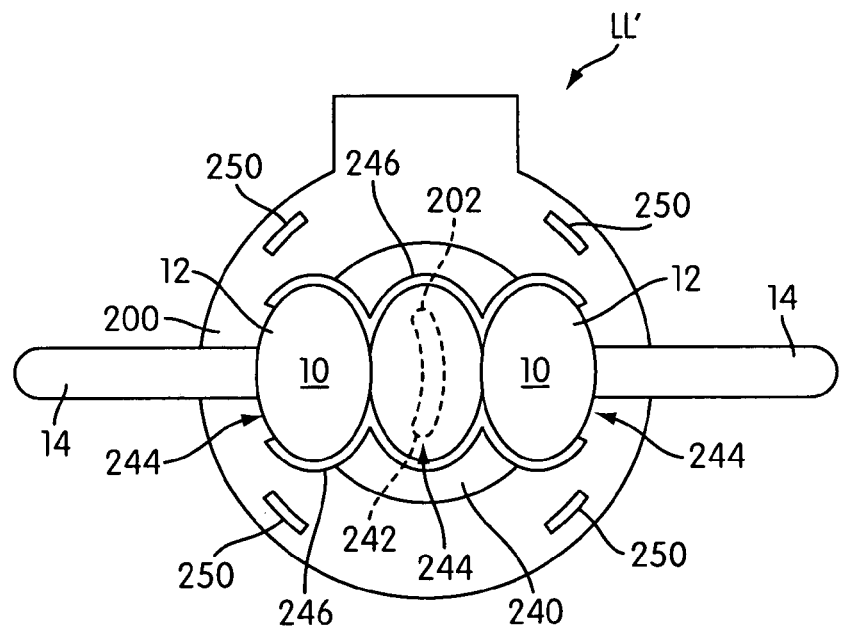
FIG. 12 is a bottom view of the leveling device of FIG. 11.

As shown in FIG. 12, the housing 200 is movably connected to a base 240. Specifically, the housing 200 has an arc-shaped slot 202 that is configured to receive an arc-shaped protrusion 242 that is located on the base 240. Of course, the slot may be located on the base and the protrusion may be located on the housing. In addition, other interacting shapes and configurations may be used. The shapes can have dissimilar configurations (for example a straight pin or pins that ride in a curved slot). The illustrated embodiment is not intended to be limiting in any way.

The arc-shaped slot 202 and protrusion 242 are shaped such that they have a large radius of curvature. In one embodiment, their centers of curvature are located at a point that is offset (displaced) from the base 240 and housing 200 of the laser level LL'. The large radius of curvature arc allows for a relatively fine adjustment of the laser beam position that is less sensitive to movement of the housing 200 relative to the base 240, as compared to a pivotal movement of a housing about an axis of rotation. Specifically, because the arc-shaped slot has a large radius of curvature, e.g. in the range of about 2.5-7.5 cm, the housing 200 may be moved relatively liberally along the arc to affect a relatively small change in the angular positioning of the laser line on the wall surface. This allows for easy manual adjustment, while viewing the bubble vial, to ensure that the line of light projected on the wall surface is either plumb or level. This is a more affective (more precise) mechanism for positioning the laser light in comparison with pivotal movements used in the prior art. In the illustrated embodiment, the slot 202 and protrusion 242 are designed to allow a total adjustment of 20° (e.g. +/−10° from center of the arc). Of course, the slot and protrusion may be designed to allow an adjustment that is greater than or less than 20°. In an embodiment, some frictional resistance is provided so that when the housing 200 is moved relative to the base 240, the position is held by frictional engagement between the base 240 and the housing 200. The illustrated embodiment is not intended to be limiting in any way.

While in one embodiment the arc configuration of the protrusion and slot may form part of a circle, it is contemplated that any curved configuration is contemplated by the term "arc" herein.

In an embodiment, the laser 210 is carried by a pendulum that is supported by the housing 200 so that the laser 210 may be self-leveling. Such a pendulum is known from U.S. Pat. No. 6,914,930, which is hereby incorporated by reference in its entirety, and is therefore not described in further detail. In such an embodiment, no bubble vial need be used. In addition, a single housing may be used rather than a base and housing movable relative to the base.

In one embodiment, the base 240 is configured to receive one to three of the mounts 10 that are described above. The pull tab 14 portions of the mounts 10 are not shown in FIGS. 11, 13, and 14. As shown in FIG. 12, the pull tabs 14 extend away from the laser level LL' a sufficient distance so that once the laser level LL' is mounted to the reference surface RS, the pull tabs 14 may be used to remove the laser level LL' from the reference surface RS, as described above.

As shown, the base 240 is molded to define three areas 244 with peripheral walls 246 that extend away from the housing 200. The areas 244 are each sized to each receive one of the mounts 10. In the illustrated embodiment, two mounts 10 are used, and the adhesive 12 of each mount 10 is shaped as an oval. In other embodiments, the adhesive 12 may be shaped as a circular disc, a square, a triangle, or other shape, and the areas 244 on the base 240 that receive the mounts 10 may be of a corresponding shape. The illustrated embodiment is not intended to be limiting in any way.

Figure 13:
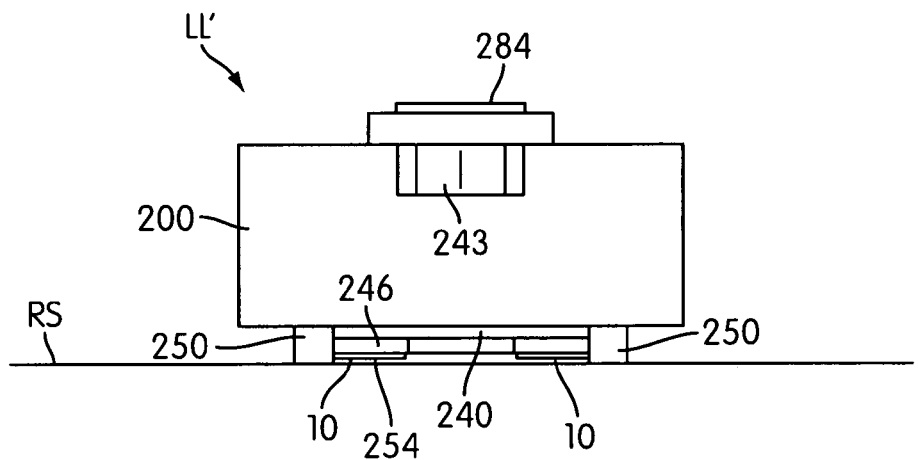
FIG. 13 is a side view of the leveling device of FIG. 11 with a plurality of spacers in an extended position.
Figure 14:
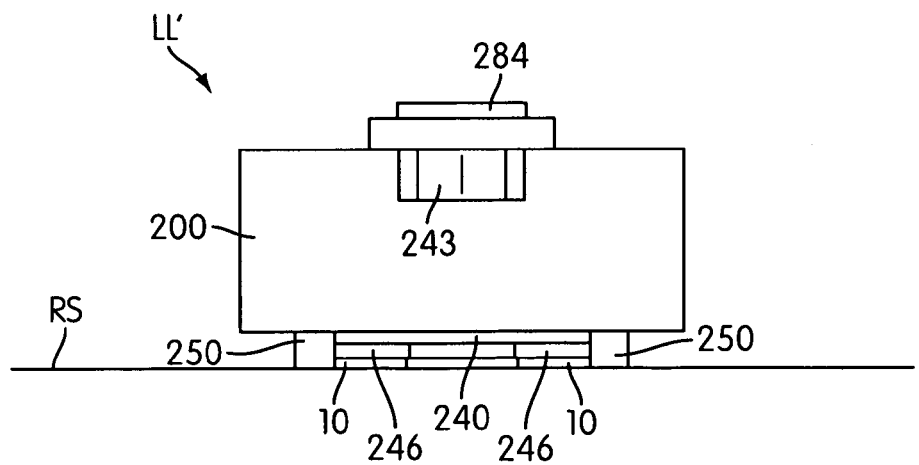
FIG. 14 is a side view of the leveling device of FIG. 13 with the plurality of spacers in a retracted position.

The laser level LL' also includes a plurality of retractable spacers 250 that are received by the housing 200. The spacers 250 are spring loaded and biased so that they extend outwardly from the housing 200 in a biased extended position, as will be discussed in greater detail below. As shown in FIG. 13, when the spacers 250 are in the extended position, they extend past the base 240 and the mounts 10 (when the mounts are attached to the base). The spacers 250 are configured to come into contact with the reference surface, without damaging the reference surface, and create a space 254 between the reference surface and the mounts 10. The spacers 250 allow the user to place the laser level LL' on the reference surface RS and position the laser level LL' to the desired location and general orientation before actually mounting the laser level LL' to the reference surface RS by engaging the adhesive with the reference surface (e.g., vertical wall). In other words, when the mounts 10 are adhered on one side thereof to the areas 244 in the base 240, the spacers 250 maintain the opposite side of the mounts 10 in spaced relation from the reference surface so that the base can be oriented as desired by sliding the spacers 250 on the reference surface until the desired position and orientation of the base is achieved, for example, by viewing one or more of the vials 230. When the desired position is attained, the user pushes the housing and/or base towards the reference surface.

The spacers 250 are configured to retract toward and at least partially into the housing 200 to a retracted position when the housing 200 is forced towards the reference surface against the bias of the internal springs, as discussed in greater detail below. When the housing 200 or base 240 is pressed toward the reference surface RS, the spacers 250 will retract toward and at least partially into the housing 200 against the bias of the springs and lock in the retracted position by an internal locking mechanism so that the internal spring does not apply a force to the mounted laser level LL' and thereby tend to push the base 240 away from the reference surface. When the spacers 250 are in the retracted position, the mounts 10 come into contact with the reference surface RS so that the laser level LL' is mounted to the reference surface via the mounts 10.

Figure 15:
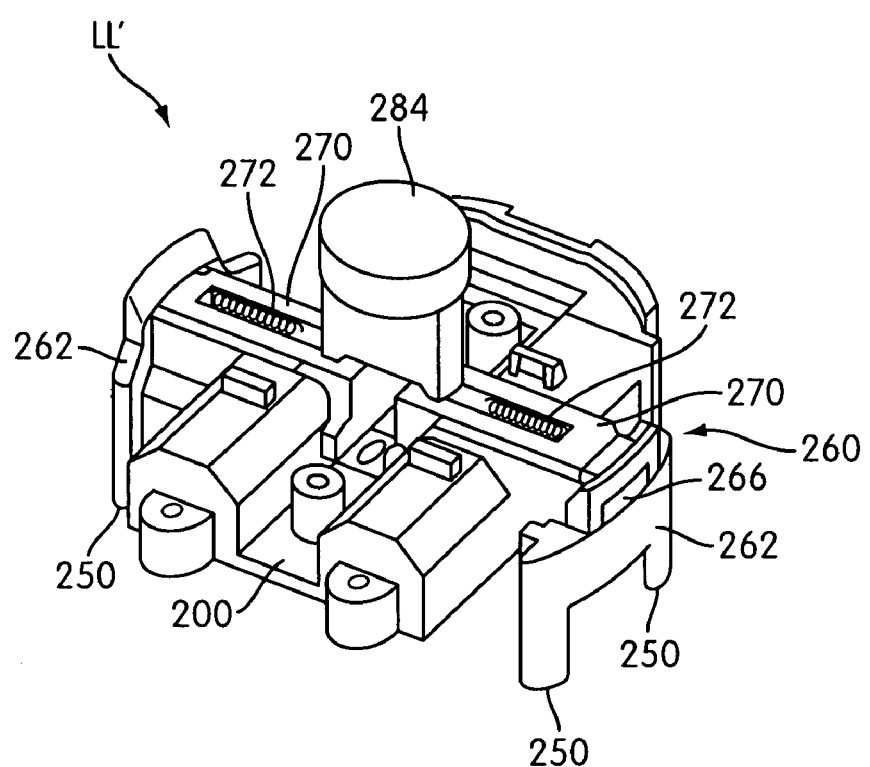
FIG. 15 is a perspective view of the leveling device of FIG. 13 with a portion of its housing removed.
Figure 16:
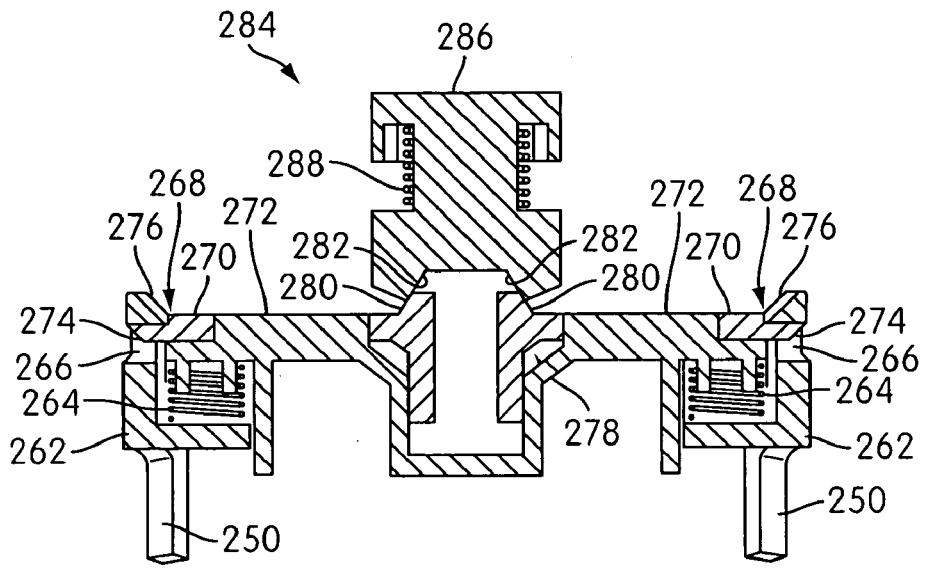
FIG. 16 is a cross-sectional view of the leveling device of FIG. 15 with the plurality of spacers in the retracted position.
Figure 17:
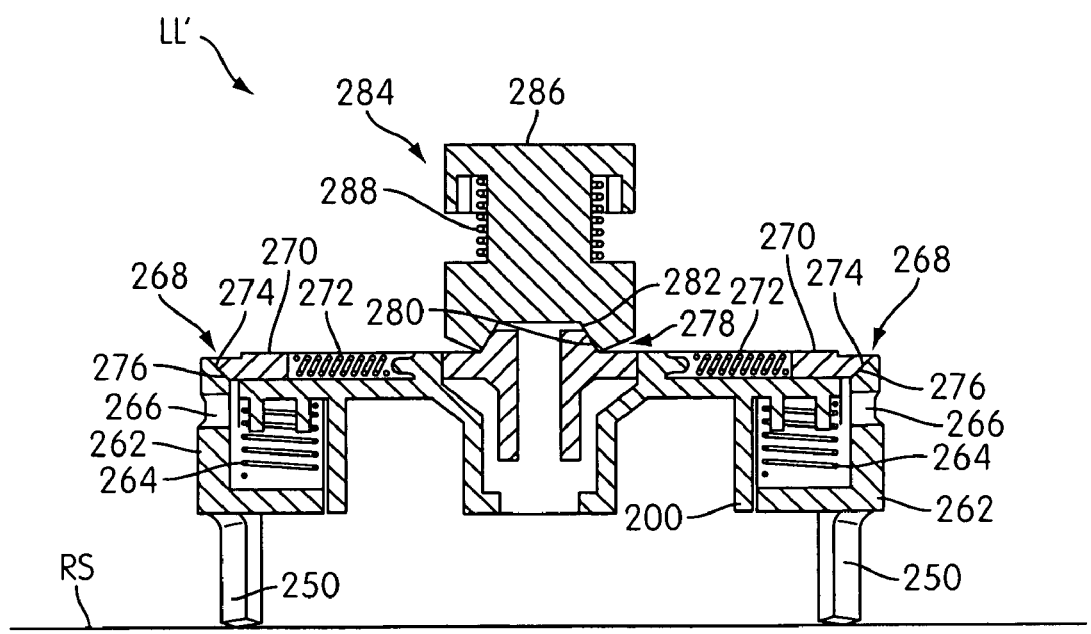
FIG. 17 is a cross-sectional view of the leveling device of FIG. 16 with the plurality of spacers in the extended position.

FIGS. 15-17 illustrate an embodiment of a spacer assembly 260 that comprises the plurality of spacers 250 in greater detail. In the illustrated embodiment, the spacer assembly 260 includes a pair of spacer members 262 that each carry a pair of reference surface engaging spacers 250. Because each side of the spacer assembly 260 is essentially the same, only one side will be discussed in further detail.

A spring 264 is provided between the housing 200 and the spacer member 262 to bias the spacer member 262, as well as the spacers 250, toward the reference surface RS when the laser level LL' engages the reference surface RS. The spacer member 262 includes an opening 266 that is configured to receive a distal end 268 of a locking member 270 when the spacer member 262 is in a retracted and locked position relative to the housing 200, as shown in FIG. 16. The locking member 270 is biased outward by a spring 272 and toward the spacer member 262. The distal end 268 of the locking member 270 includes a sloped surface 274 that is configured to engage a corresponding sloped surface 276 defined by an upper portion of the spacer member 262. When the spacer member 262 is in the extended position, a force that is provided to the spacers 250 in a direction toward the housing 200 will cause the spacer member 262 to move against the bias of the spring 264. Such movement causes the sloped surface 276 on the upper portion of the spacer member 262 to slide along the sloped surface 274 of the distal end 268 of the locking member 270, thereby causing the locking member 270 to move against the bias of the spring 272. When the spacer member 262 moves to a position that aligns opening 266 with the distal end 268 of the locking member 270, the bias of the spring 272 causes the locking member 270 to move into the opening 266, thereby locking the spacer member 262 in the retracted position relative to the housing 200, as shown in FIG. 16.

A proximal end portion 278 of the locking member 270 includes a sloped surface 280 the is configured to engage a sloped surface 282 provided by a releasing button 284. An opposite end 286 of the releasing button 284 is configured to be received by the user's finger or thumb. The releasing button 284 is biased to a non-engaging position by a spring 288 that is positioned between the housing 200 and the releasing button 284. When the locking member 270 is biased in its locked position, i.e. the distal end 268 is engaged with the spacer member 262 in the opening 266, and the releasing button 284 is biased in its upward position, the spacers 250 remain in the retracted position relative to the housing 200.

When the user would like to move the spacers 250 to the extended position (see FIG. 17), the user presses the releasing button 284 against the bias of the spring 288. This causes the sloped surface 282 to engage and ride along the sloped surface 280 provided by the proximal end portion 278 of the locking member 270, which causes the locking member 270 to move against the bias of the spring 272. When the locking member 270 has moved a distance that allows the distal end 268 to pull out of the opening 266, the bias of the spring 264 causes the spacer member 262 to move to the extended position relative to the housing 200. The illustrated embodiment tended to be limiting in any way.

Returning to FIG. 11, once the laser level LL' is firmly mounted to the reference surface, the vials 230 may be used to more finely adjust the orientation of the housing 200 relative to the base 240 so that the beam of light generated by the laser 210 is either horizontal or vertical, depending on which vial 230 is being used. As discussed above, the arc shaped slot 202 and protrusion 242 provide for an adjustment. In one embodiment, the arc shaped slot 202 defines an arc that provides about 20° of movement (i.e., ±10° from the center of the arc). Of course, if the user would rather use the laser 210 to generate a line between two existing points on the reference surface, the levels 230 do not have to be used at all.

It should be appreciated that, in one embodiment, the spacer assembly 260 can be used with a laser level that has a single housing that integrates what is disclosed above as the base and the housing. For example, in a contemplated embodiment, a pendulum for mounting the light source (laser diode) can be used instead of the bubble vial for leveling the laser line projected on the wall surface.

To remove the laser level LL' from the reference surface, the pull tab 14 of each mount 10 may be pulled in a direction that is substantially parallel to the reference surface so as to deform the adhesive 12 and allow the cohesive bonds between the adhesive 12 and the reference surface to break, thereby releasing the mounts 10 from the reference surface, as described above. If the mounts 10 are still attached to the base 240, they may be peeled off of the base, or the pull tabs 14 may be pulled again so that the mounts 10 release from the base 240.

After (or concurrently with) removal of the laser level LL' from the reference surface, the spacers 250 can be moved again to the extended position. This can be achieved by pushing the releasing button 284, which releases the spacers 250 from being locked by the locking mechanism in the retracted position, so that the internal spring 264 moves the spacers 250 to the extended position.

The foregoing illustrated embodiments have been provided to illustrate the structural and functional principles of the present invention and are not intended to be limiting. To the contrary, the present invention is intended to encompass all modifications, alterations and substitutions within the spirit and scope of the appended claims.

What is claimed is:

1. A mount for removably mounting a device to a reference surface, the mount comprising:

a thermoplastic hot melt adhesive having a first surface and a second surface facing a direction opposite to the first surface, the first and second surfaces defining a thickness of the adhesive, wherein at least a portion of the adhesive is uninterrupted through the thickness thereof from the first surface to the second surface; and a tab that extends from the adhesive, the adhesive being configured to adhere the first surface to the reference surface and the second surface to the device when the device is mounted to the reference surface, and to be removed from the reference surface without damaging the reference surface by moving the tab in a direction substantially parallel to the reference surface.

2. A mount according to claim 1, wherein the adhesive is substantially in a shape of disc.

3. A mount according to claim 2, wherein the disc has a diameter of about 20 mm.

4. A mount, according to claim 2, wherein the thickness of the disc is about 3 mm.

5. A mount according to claim 1, wherein the adhesive has a volume of between about 0.15 cm$^3$ and about 3.0 cm$^3$.

6. A mount according to claim 1, wherein the tab comprises a substantially non-stretchable material.

7. A mount according to claim 6, wherein the tab comprises polyvinylchloride.

8. A mount according to claim 1, wherein the tab includes a hinge in a center portion thereof, and wherein one end of the tab is attached to the first surface of the adhesive and the other end of the tab is attached to the second surface of the adhesive.

9. A device comprising:

a housing for supporting at least one light source arranged to form a line of light on a reference surface;

a leveling device for positioning the light source so that the line of light projects on the reference surface in a desired orientation; and a mount for removably mounting the housing to a reference surface, the mount comprising a thermoplastic hot melt adhesive having a first surface and a second surface facing a direction opposite to the first surface, the first and second surfaces defining a thickness of the adhesive, and a tab attached to the adhesive, the adhesive being configured to adhere the first surface to the reference surface and the second surface to the housing when the housing is mounted to the reference surface and to be removed from the reference surface without damaging the reference surface by moving the tab in a direction substantially parallel to the reference surface, wherein at least a portion of the adhesive is uninterrupted through the thickness thereof from the first surface to the second surface.

10. A device according to claim 9, wherein the leveling device comprises at least one vial.

11. A device according to claim 9, wherein the leveling device comprises a pendulum.

12. A device according to claim 9, wherein the light source comprises a laser.

13. A device according to claim 12, further comprising a power source for providing power to the laser, the power source being supported by the housing.

14. A device according to claim 9, wherein the adhesive is substantially in a shape of disc.

15. A device according to claim 14, wherein the disc has a diameter of about 24 mm.

16. A device according to claim 14, wherein the thickness of the disc is about 3 mm.

17. A device according to claim 9, wherein the adhesive has a volume of between about 0.15 cm³ and about 3.0 cm³.

18. A device according to claim 9, wherein the tab comprises a substantially non-stretchable material.

19. A device according to claim 18, wherein the tab comprises polyvinylchloride.

20. A device according to claim 9, wherein the desired orientation is level.

21. A device according to claim 9, wherein the desired orientation is plumb.

22. A device according to claim 9, further comprising a base to which the housing is mounted, the housing being mounted to the reference surface via the base, the base receiving the mount.

23. A device according to claim 9, wherein the tab includes a hinge in a center portion thereof, and wherein one end of the tab is attached to the first surface of the adhesive and the other end of the tab is attached to the second surface of the adhesive.

24. A mount for removably mounting a device to a reference surface, the mount comprising:

a thermoplastic hot melt adhesive having a first surface and a second surface facing a direction opposite to the first surface, the first and second surfaces defining a thickness of the adhesive, wherein a portion of the adhesive is devoid of a non-adhesive material within the thickness; and a tab that extends from the adhesive, the adhesive being configured to adhere the first surface to the reference surface and the second surface to the device when the device is mounted to the reference surface, and to be removed from the reference surface without damaging the reference surface by moving the tab in a direction substantially parallel to the reference surface.

* * * * *